(12) United States Patent
Sontowski et al.

(10) Patent No.: US 8,654,904 B2
(45) Date of Patent: Feb. 18, 2014

(54) SCALING EQUALIZER COEFFICIENTS AFTER AUTOMATIC GAIN CONTROLLER GAIN ADJUSTMENTS

(75) Inventors: Uwe Sontowski, Riverview (AU); Dominic W. Yip, Sydney (AU)

(73) Assignee: Agere Systems LLC, Allentown, PA (US)

( * ) Notice: Subject to any disclaimer, the term of this patent is extended or adjusted under 35 U.S.C. 154(b) by 1345 days.

(21) Appl. No.: 11/869,394

(22) Filed: Oct. 9, 2007

(65) Prior Publication Data

US 2009/0092181 A1    Apr. 9, 2009

(51) Int. Cl.
*H03H 7/40* (2006.01)
*H04L 27/06* (2006.01)

(52) U.S. Cl.
USPC .......................... 375/345; 375/344; 375/229

(58) Field of Classification Search
USPC .................. 375/229–236, 316, 295, 375/240.26–240.27, 284, 285, 296, 297, 375/318, 317, 319, 344–346, 350; 330/278, 330/291
See application file for complete search history.

(56) References Cited

U.S. PATENT DOCUMENTS

| | | | |
|---|---|---|---|
| 6,654,430 B1 * | 11/2003 | Kim et al. | 375/346 |
| 2004/0037354 A1 * | 2/2004 | Jayaraman et al. | 375/229 |
| 2008/0030265 A1 * | 2/2008 | Ido et al. | 329/317 |
| 2008/0219332 A1 * | 9/2008 | Brehler | 375/219 |

* cited by examiner

*Primary Examiner* — Sam K Ahn
*Assistant Examiner* — Linda Wong
(74) *Attorney, Agent, or Firm* — Mendelsohn, Drucker & Dunleavy, P.C.; Craig M. Brown; Steven Mendelsohn (57) ABSTRACT

In one embodiment, a receiver comprises an automatic gain controller (AGC), an equalizer, a controller, and a register interface. The AGC makes gain adjustments to compensate for changes in the average amplitude of a received signal. The equalizer has a coefficient updater that calculates coefficients and a finite impulse response (FIR) filter that applies the coefficients to the received signal to generate an equalized signal. During gain adjustments by the AGC, the register interface provides a weight freeze signal to the coefficient updater, which subsequently freezes the updating of the coefficients for a freeze duration period. Then, register interface provides a scaling factor, generated by the controller based on the size of the gain adjustment, to the coefficient updater. At the end of the freeze period, coefficient updater applies the scaling factor to the coefficients and unfreezes the coefficient updating.

21 Claims, 8 Drawing Sheets

SCALING EQUALIZER COEFFICIENTS AFTER AUTOMATIC GAIN CONTROLLER GAIN ADJUSTMENTS

CROSS-REFERENCE TO RELATED APPLICATIONS

The subject matter of this application is related to PCT patent application no. PCT/US07/00622 filed 10 Jan. 2007, U.S. patent application Ser. No. 11/710,212 filed 23 Feb. 2007, U.S. patent application Ser. No. 11/731,173 filed 30 Mar. 2007, and U.S. patent application Ser. No. 11/782,845 filed 25 Jul. 2007, the teachings of all of which are incorporated herein by reference.

BACKGROUND OF THE INVENTION

1. Field of the Invention

The present invention relates to signal processing receivers, and, more specifically, to methods and apparatuses for equalizing signals received by such devices.

2. Description of the Related Art

In communication systems, such as systems that adhere to the 3rd generation partnership project (3GPP) release 5 (R5) or release 6 (R6) standards, an automatic gain controller (AGC) is typically employed at the front end of a receiver to compensate for changes in the average amplitude of a received signal. These changes may result from channel effects such as fading or from fluctuations in a transmitter's power. When an AGC experiences relatively large changes in the average amplitude of a received signal, the AGC performs gain adjustments to compensate for these changes. Downstream of the AGC, an equalizer is typically employed, which equalizes the received signal to closely approximate the original pre-transmission signal. When gain adjustments occur at the AGC, if the equalizer does not adapt quickly to the gain changes, then errors may result during recovery of the transmitted data, and consequently, the data may need to be retransmitted.

SUMMARY OF THE INVENTION

In one embodiment, the present invention is an apparatus for processing an input signal. The apparatus comprises an equalizing filter and a filter coefficient updater. The equalizing filter is adapted to filter the input signal based on a set of filter coefficients to generate an equalized signal. The filter coefficient updater is adapted to update the set of filter coefficients, wherein, upon occurrence of a change in gain applied to the input signal prior to the equalizing filter, the filter coefficient updater is adapted to apply, to the set of filter coefficients, a scale factor based on the amount of the gain change.

In another embodiment, the present invention is a method for processing an input signal. The method comprises equalization filtering the input signal based on a set of filter coefficients to generate an equalized signal. Further, the method comprises updating the set of filter coefficients, wherein, upon occurrence of a change in gain applied to the input signal prior to the equalization filtering, a scale factor based on the amount of the gain change is applied to the set of filter coefficients.

In yet another embodiment, the present invention is another method for processing an input signal. The other method comprises equalizing a first portion of the input signal to generate a first portion of an equalized signal by filtering the first portion of the input signal using updated filter coefficients generated based on an error measure corresponding to the equalized signal. Further, upon occurrence of a change in gain applied upstream to the input signal, the method comprises equalizing a second portion of the input signal to generate a second portion of the equalized signal by filtering the second portion of the input signal using scaled filter coefficients generated by applying, to the updated filter coefficients, a scale factor based on the amount of the gain change.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
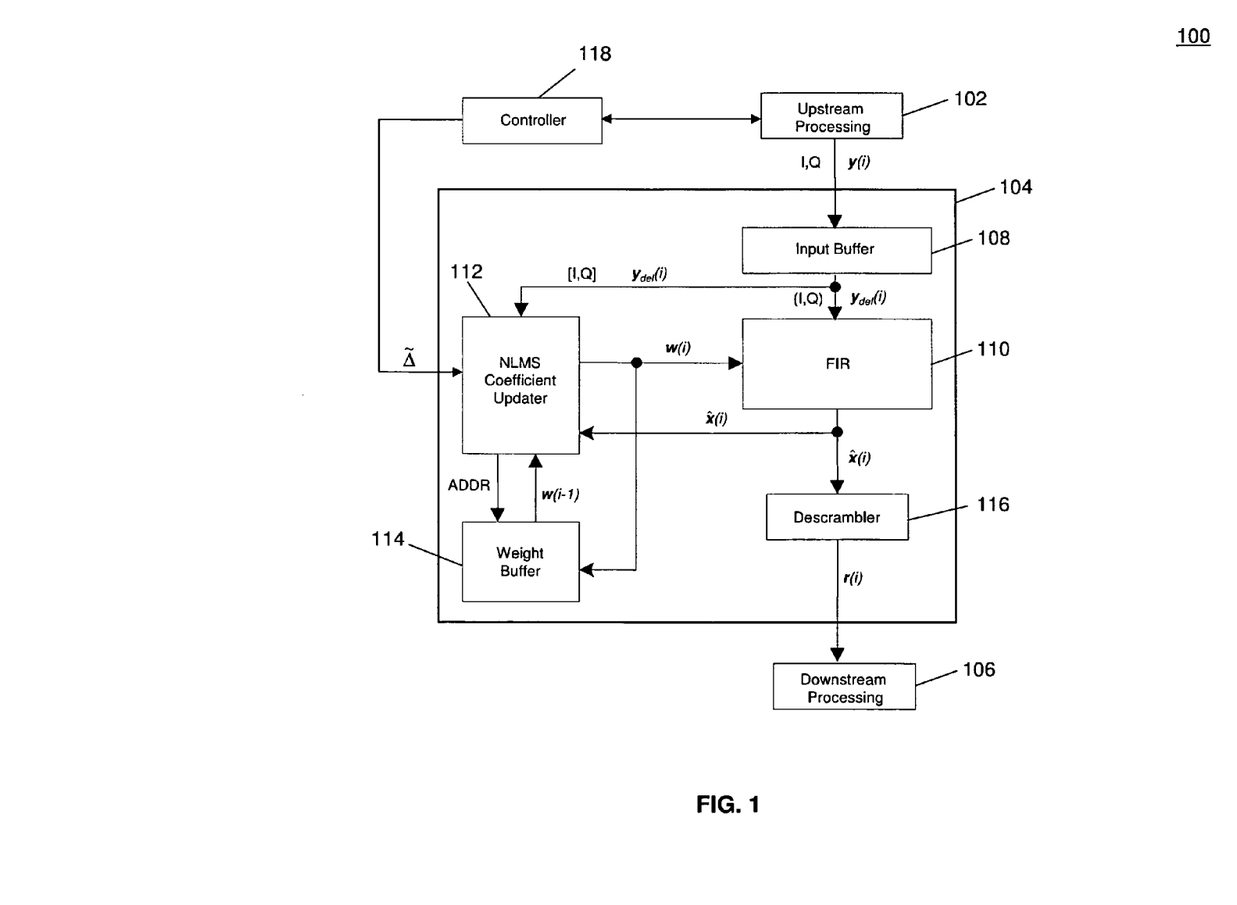
FIG. 1 shows a block diagram of one implementation of a receiver.

FIG. 1 shows a block diagram of one implementation of a receiver 100. Receiver 100 has upstream processing 102, which performs pre-equalization processing, including automatic gain control, analog-to-digital conversion, and other processing suitable for preparing a received signal for equalization. Normalized-least-mean-squares (NLMS) equalizer 104 equalizes and descrambles digitized data signal y(i) from upstream processing 102 to closely approximate the original pre-transmission signal and outputs descrambled, equalized signal r(i). Descrambled, equalized signal r(i) is then processed by downstream processing 106, which might include symbol estimation, data symbol de-mapping, or other post-equalization processing for recovering one or more output data streams from the received signal.

NLMS equalizer 104 equalizes digital signal y(i) using an update loop that comprises input buffer 108, finite impulse response (FIR) filter 110, coefficient updater 112, and weight buffer 114. Input buffer 108 delays received signal y(i) and provides delayed signal $y_{del}(i)$ to FIR filter 110 and coefficient updater 112. Coefficient updater 112 calculates coefficients w(i) (e.g., w(i)=w$_1$(i), w$_2$(i), . . . , w$_N$(i)), where each coefficient w$_j$(i) corresponds to a tap j of FIR filter 110, and provides the coefficients w(i) to weight buffer 114 and FIR filter 110. Weight buffer 114 may be implemented using addressable memory. FIR filter 110 applies coefficients w(i) to delayed signal y$_{del}$(i) and outputs equalized signal $\hat{x}$(i). Equalized signal $\hat{x}$(i) is then descrambled by descrambler 116 and the equalized, descrambled signal r(i) is provided to downstream processing 106.

Coefficients w(i) may be generated using any one of a number of approaches commonly known in the art. According to the embodiment of FIG. 1, coefficient updater 112 calculates each coefficient w$_j$(i) using an NLMS calculation such as that shown in Equation (1):

$$w_j(i) = w_j(i-1) - \tilde{\Delta}\frac{y_{del,j}(i)e^*(i)}{\|y_{del}(i)\|^2}, \quad (1)$$

$$\text{for } j = 1, 2, \ldots, N$$

where w$_j$(i−1) is the prior coefficient for the corresponding tap j of FIR filter 110, $\tilde{\Delta}$ is a step size, y$_{del,j}$(i) is the sample of delayed signal y$_{del}$(i) corresponding to tap j, e*(i) is the complex conjugate of an error signal e(i), and $\|y_{del}(i)\|$ is the magnitude of delayed signal y$_{del}$(i). Step size $\tilde{\Delta}$ is typically between 0 to 1 and is generated by controller 118 based on information communicated to controller 118 from upstream processing 102, such as the occurrence of a gain adjustment at the AGC.

The accuracy of NLMS equalizer 104 in approximating the original pre-transmission signal is measured by error signal e(i). Thus, a smaller error e(i) represents improved equalizer performance. Error signal e(i) is obtained by comparing equalized output $\hat{x}$(i) of FIR filter 110 to a reference signal x(i) as shown in Equation (2) below:

$$e(i) = \hat{x}(i) - x(i) \quad (2)$$

The reference signal x(i) represents the ideal value for the received signal, assuming no adverse effects from transmission. In conventional applications, a portion of the transmitted signal is not known by the receiver. However, a pilot signal z(i), such as the common pilot channel (CPICH) in a 3$^{rd}$ Generation Partnership Project (3GPP) application, which contains a known sequence of bits, may be transmitted for training and tracking purposes. Thus, equalized signal $\hat{x}$(i) may be compared to the known pilot signal z(i) to determine an error measure ê(i) that approximates the true error e(i) as shown in Equation (3):

$$e(i) \approx \hat{e}(i) = \hat{x}(i) - z(i). \quad (3)$$

The complex conjugate ê*(i) of error measure ê(i) may then be substituted into Equation (1) to produce coefficients w(i).

Figure 2:
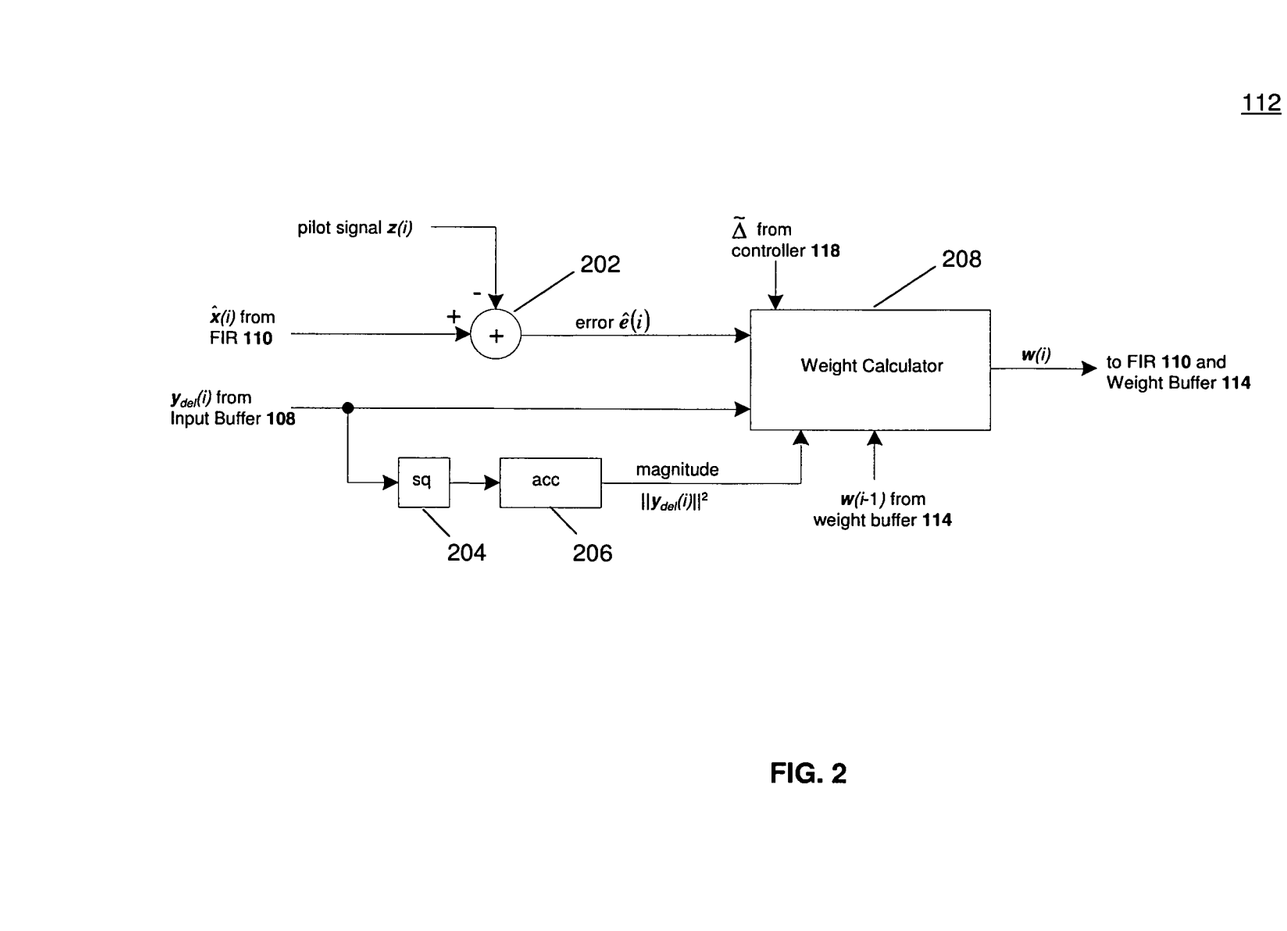
FIG. 2 shows a simplified block diagram of one implementation of the coefficient updater of the receiver of FIG. 1.

FIG. 2 shows a simplified block diagram of one implementation of coefficient updater 112 of receiver 100 of FIG. 1. Coefficient updater 112 has error calculator 202, which compares equalized signal $\hat{x}$(i) from FIR filter 110 to a reference signal z(i) as shown in Equation (3) to generate error measure ê(i). Square calculator 204 squares samples of delayed signal y$_{del}$(i) from input buffer 108. Accumulator (ACC) 206 accumulates the squared values and outputs the squared magnitude $\|y_{del}(i)\|^2$ of delayed signal y$_{del}$(i). Weight calculator 208 receives (1) error measure ê(i) from error calculator 202, (2) delayed signal y$_{del}$(i) from input buffer 108, (3) squared magnitude $\|y_{del}(i)\|^2$ from ACC 206, (4) prior coefficients w(i−1) from weight buffer 114, and (5) a step size $\tilde{\Delta}$ from controller 118, and calculates coefficients w(i) using Equation (1). Coefficients w(i) are then provided to FIR filter 110 and weight buffer 114.

When the automatic gain controller (AGC) at the front end of receiver 100 (i.e., at upstream processing 102) performs a gain adjustment, NLMS equalizer 104 adapts to the adjustment by iteratively generating coefficients w(i). However, the time it takes for NLMS equalizer 104 to adapt to the adjustment may be relatively large. Failure to quickly adapt may lead to errors in recovering the one or more output data streams, and consequently, the data may need to be retransmitted.

Several methods may be employed to reduce the time for NLMS equalizer 104 to adapt in response to gain adjustments. In one such method, equalizer parameters such as step size $\tilde{\Delta}$ may be tuned for quicker adaptation. For example, controller 118 may generate a larger step size $\tilde{\Delta}$ for more rapid initial adaptation. However, as step size $\tilde{\Delta}$ is increased, adaptation noise in the coefficient calculations reduces the accuracy of the coefficients w(i), which in turn can lead to errors in downstream processing. A gear-shifting method may be employed in which controller 118 increases step size $\tilde{\Delta}$ to force more aggressive adaptation initially, and then decreases step size $\tilde{\Delta}$ to fine-tune the adaptation such that the final adaptation is more accurate. As step size $\tilde{\Delta}$ is decreased, the time for adaptation increases. While gear-shifting methods are effective, the time for NLMS equalizer 104 to adapt after gain adjustments may still be too long, resulting in errors in recovering the one or more output data streams.

To further reduce the amount of time in which the equalizer adapts in response to an AGC gain adjustment, a scaling factor, which is based on the size of the AGC gain adjustment, can be applied to the filter coefficients w(i) at the exact moment that the output of the AGC reflects the new gain. However, this time is typically not known within the receiver. Thus, as an alternative, coefficient updating may be frozen during the period in which the gain adjustment might take effect, a scaling factor may be applied to the coefficients w(i) during the freeze period, and coefficient updating may be resumed at the conclusion of the freeze period. To further illustrate the timing of an AGC gain adjustment, consider time scale 300 illustrated in FIG. 3.

Figure 3:
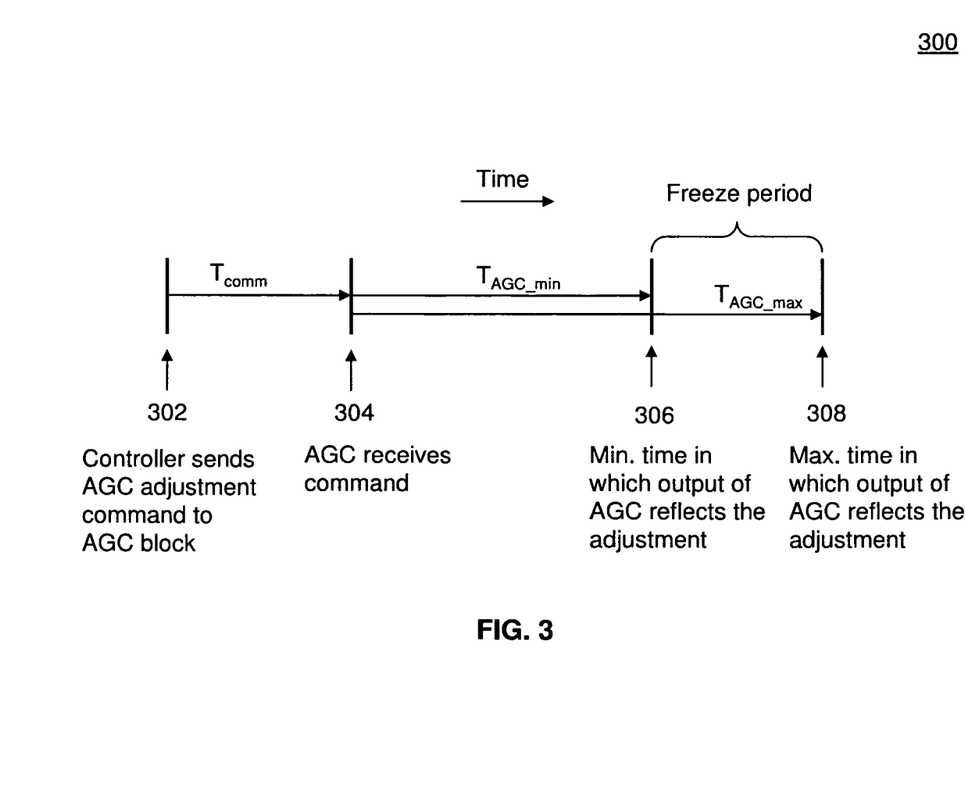
FIG. 3 shows a time scale of a hypothetical automatic gain controller gain adjustment.

FIG. 3 shows a time scale 300 of a hypothetical gain adjustment of an AGC. At time 302, a controller (e.g., controller 118 of receiver 100) provides a gain adjustment command to the AGC following detection of a relatively large change in average amplitude of the received signal. The command is received by the AGC at time 304. The exact length of time that passes before the output of the AGC reflects the new gain is indefinite; however, minimum and maximum response times of the AGC to various gain adjustments may be determined through field trials and these times may be programmed into the receiver. The minimum time 306 in which the output of the AGC might reflect the new gain is obtained by adding the minimum response time of the AGC to time 304. The maximum time 308 in which the output of the AGC might reflect the new gain is obtained by adding the maximum response time of the AGC to time 304. The period in which the new gain might take effect is the time between the minimum time 306 and the maximum time 308 and this period may be used as the freeze period.

Figure 4:
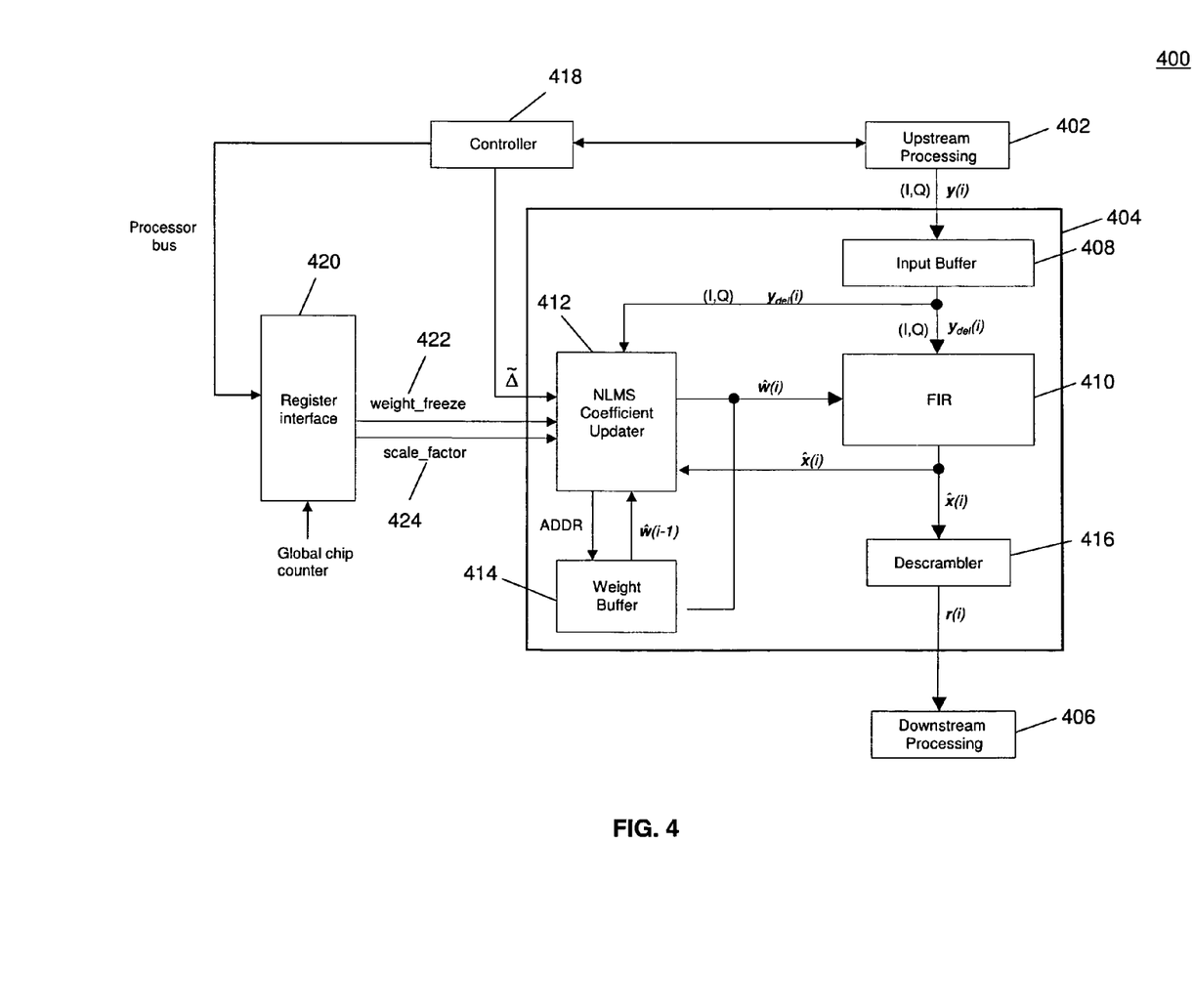
FIG. 4 shows a simplified block diagram of a receiver according to one embodiment of the present invention.

FIG. 4 shows a simplified block diagram of a receiver 400 according to one embodiment of the present invention. Receiver 400 has upstream processing 402, which performs operations analogous to upstream processing 102 of receiver 100 of FIG. 1 to generate digitized data signal y(i). Signal y(i) is provided to NLMS equalizer 404, which equalizes signal y(i) to closely approximate the original pre-transmission signal. Similar to NLMS equalizer 104 of receiver 100, NLMS equalizer 404 equalizes digital signal y(i) using an update loop. The update loop comprises input buffer 408, finite impulse response (FIR) filter 410, and weight buffer 414, which perform operations analogous to those of the equivalent processing of receiver 100. The update loop also comprises coefficient updater 412, which generates scaled coefficients ŵ(i) based on the occurrence or non-occurrence of an AGC gain adjustment. The generation of scaled coefficients ŵ(i) is controlled by register interface 420 as described in further detail below. FIR filter 410 applies scaled coefficients w(i) to delayed signal $y_{del}(i)$ to generate equalized signal x̂(i), which is subsequently descrambled by descrambler 416. The descrambled, equalized signal r(i) is then provided to downstream processing 406, which performs operations analogous to those of downstream processing 106 of receiver 100.

Register interface 420 comprises 1) a freeze start register, 2) a freeze duration register, and 3) a scaling factor register. When a gain adjustment is performed by the AGC, controller 418 calculates a freeze start time and a scaling factor and provides these calculations to register interface 420 via the processor bus, where they are stored in their respective registers. To understand the calculations of the freeze start time and the freeze duration, refer to the timeline of FIG. 3. The freeze start time (e.g., time 306) is calculated by adding the minimum response time of the AGC to the time that the AGC receives the gain adjustment command (e.g., time 304). The time that the AGC receives the gain adjustment command is determined by adding the interprocessor delay, which is known either by design or by simulation, to the time that the gain adjustment command is provided by controller 418. The freeze duration is obtained by subtracting the minimum response time of the AGC from the maximum response time of the AGC. Note that, since the minimum and maximum response times of the AGC are pre-programmed into the receiver, the freeze duration does not change from one gain adjustment to the next, and therefore, it does not need to be calculated for each gain adjustment. The scaling factor is calculated as the reciprocal of the gain adjustment. When the gain adjustment is represented in dB, the scaling factor is defined according to Equation (4) below:

$$\text{scaling factor} = 10^{\frac{X}{10}} \quad (4)$$

where X is the negative of the gain value in dB. For example, if the gain adjustment is 3 dB (i.e., a doubling of the gain), then the scaling factor is $$10^{\frac{-3}{10}} = 0.5,$$

and the coefficients are scaled by −3 dB.

Register interface 420 provides weight_freeze signal 422 and scale_factor signal 424 to NLMS coefficient updater 412. When a gain adjustment is performed by the AGC, register interface 420 asserts the weight_freeze signal 422 to initiate the freeze period. During the freeze period, coefficient updater 412 freezes the updating of coefficients w(i) (i.e., coefficients w(i) are set equal to the prior coefficients w(i−1)), and register interface 420 provides the scaling factor via scale_factor signal 424 to coefficient updater 412. At the conclusion of the freeze period, register interface 420 de-asserts weight_freeze signal 422, coefficient updater 412 applies the scaling factor to coefficients w(i), and the updating of coefficients w(i) is resumed.

Figure 5:
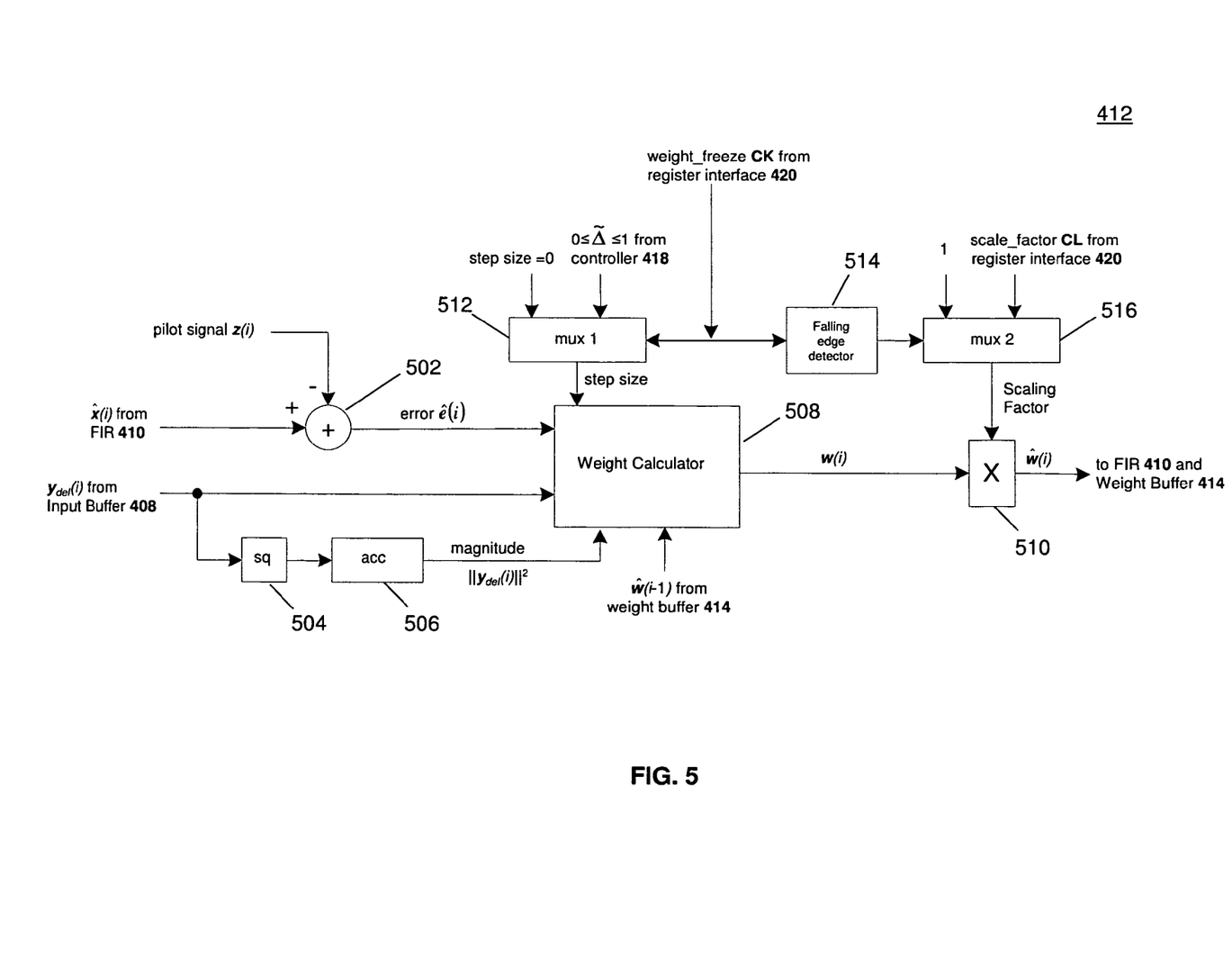
FIG. 5 shows a simplified block diagram of the coefficient updater of the receiver of FIG. 4 according to one embodiment of the present invention.

FIG. 5 shows a simplified block diagram of coefficient updater 412 of receiver 400 according to one embodiment of the present invention. Coefficient updater 412 has error calculator 502, which compares equalized signal x̂(i) from FIR filter 410 to a reference signal z(i) as shown in Equation (3) to generate error measure ê(i). Square calculator 504 squares samples of delayed signal $y_{del}(i)$ from input buffer 408, and accumulator (ACC) 506 accumulates the squared values to generate squared magnitude $\|y_{del}(i)\|^2$ of delayed signal $y_{del}(i)$.

Weight calculator 508 receives (1) error measure ê(i) from error calculator 502, (2) delayed signal $y_{del}(i)$ from input buffer 408, (3) squared magnitude $\|y_{del}(i)\|^2$ from ACC 506, (4) prior scaled coefficients ŵ(i−1) from weight buffer 414, and (5) a step size from the first multiplexer (mux1) 512, and calculates coefficients w(i) using Equation (1). Coefficients w(i) are provided to multiplier 510 where they are multiplied by a scaling factor received from the second multiplexer (mux2) 516 to generate scaled coefficients ŵ(i). To further understand the operation of mux1 512 and mux2 516, consider Table I and the flow diagram of FIG. 6.

TABLE I

OUTPUTS OF MUX1 512 AND MUX2 516 RESULTING FROM THE INPUT VALUE OF WEIGHT_FREEZE 422

| weight_freeze 422 | output of mux1 512 | output of mux2 516 |
|---|---|---|
| 0 | $0 \leq \tilde{\Delta} \leq 1$ | 1 |
| 1 | step size = 0 | 1 |
| 1 to 0 | step size = 0 | scale_factor |

As shown in Table I, if weight_freeze 422 is de-asserted (i.e., equal to 0), then mux1 512 provides step size Δ̃, which is generated by controller 418, to weight calculator 508, and mux2 516 provides a scaling factor of 1 to multiplier 510. If weight_freeze 422 is asserted (i.e., equal to 1), then mux1 512 provides a step size of 0 to weight calculator 508, and mux2 516 provides a scaling factor of 1 to multiplier 510. At the moment that weight_freeze 422 is de-asserted, mux1 512 provides a step size of 0 to weight calculator 508, and mux2 516 provides a scaling factor based on the size of the AGC adjustment to multiplier 510.

Figure 6:
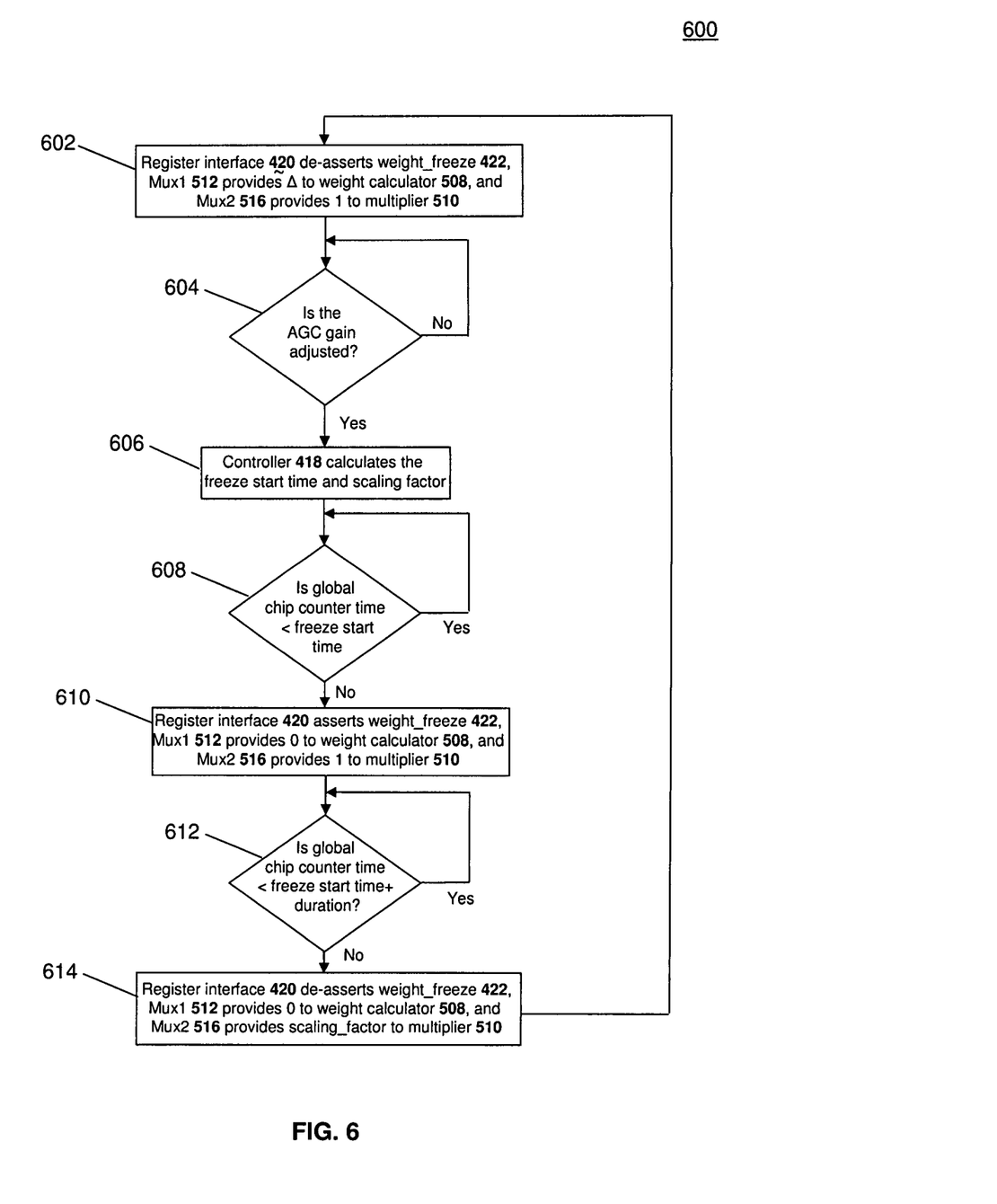
FIG. 6 shows a simplified flow diagram of freezing and scaling operations performed by the receiver of FIG. 4 according to one embodiment of the present invention.

FIG. 6 shows a simplified flow diagram 600 of freezing and scaling operations performed by receiver 400 according to one embodiment of the present invention. Initially, register interface 420 de-asserts weight_freeze signal 422 as shown in operation 602. While weight_freeze is de-asserted, mux1 512 provides step size Δ̃ from controller 418 to weight calculator 508, and mux2 516 provides a scaling factor of 1 to multiplier 510. Weight Calculator 508 performs Equation (1) using step size Δ̃ from controller 418 to generate coefficient w(i) and multiplier 510 multiplies coefficients w(i) by the scaling factor of 1 to generate scaled coefficients ŵ(i).

Controller 418 then performs decision 604 to determine whether an AGC gain adjustment is being performed. If an AGC gain adjustment is not being performed, then processing returns to operation 602. When a gain adjustment is performed, controller 418 calculates the freeze start time and the scaling factor (i.e., operation 606) as described above and provides the results to register interface 420. Register interface 420 then compares the global chip counter time to the freeze start time (i.e., decision 608). Mux1 512 provides step size Δ̃ from controller 418 to weight calculator 508, and mux2

516 provides the scaling factor of 1 to multiplier 510, until the global chip counter time is greater than or equal to the freeze start time.

When the global chip counter time is greater than or equal to the freeze start time, register interface 420 asserts weight_freeze signal 422 (i.e., operation 610). While weight_freeze is asserted, mux1 512 provides a step size of 0 to weight calculator 508, and mux2 516 provides a scaling factor of 1 to multiplier 510. Weight calculator 508 performs Equation (1) using the step size of 0 to calculate coefficients w(i). Note that, by using a step size of 0, the subtracted term in Equation (1) is also equal to zero. Thus, the new coefficients w(i) are made equal to the prior scaled coefficients $\hat{w}(i-1)$ so that updating of the prior coefficients $\hat{w}(i-1)$ is frozen.

Register interface 420 then determines whether the global chip counter time is less than the freeze start time plus the freeze duration (i.e., decision 612). Mux1 512 provides the step size of 0 to weight calculator 508, and mux2 516 provides the scaling factor of 1 to multiplier 510, until the global chip counter time is greater than or equal to the freeze start time plus the duration. At the moment that the global chip counter time is first greater than or equal to the freeze start time plus the duration, register interface 420 de-asserts weight_freeze signal 422 (i.e., operation 614). Falling edge detector 514 detects the de-assertion of weight_freeze signal 422 and directs mux2 516 to provide scale_factor signal 424 to multiplier 510. After the scaling factor is provided, weight_freeze signal 422 remains de-asserted, and processing returns to operation 602.

By scaling the coefficients w(i) based on the size of a particular AGC gain adjustment, receiver 400 is capable of adapting to the gain adjustment quicker then receiver 100. As a result of the quicker adaptation, receiver 400 may recover the transmitted data using fewer retransmissions than receiver 100, and consequently, the throughput of receiver 400 may be greater than that of receiver 100.

According to alternative embodiments, the present invention may be implemented for receivers that employ receive diversity techniques. In such embodiments, the receiver receives two or more versions of a transmitted signal, and the two or more versions may be pre-processed independently, using a separate AGC for each received signal. As an example, consider the embodiment of FIG. 7, which processes two received versions of a transmitted signal.

Figure 7:
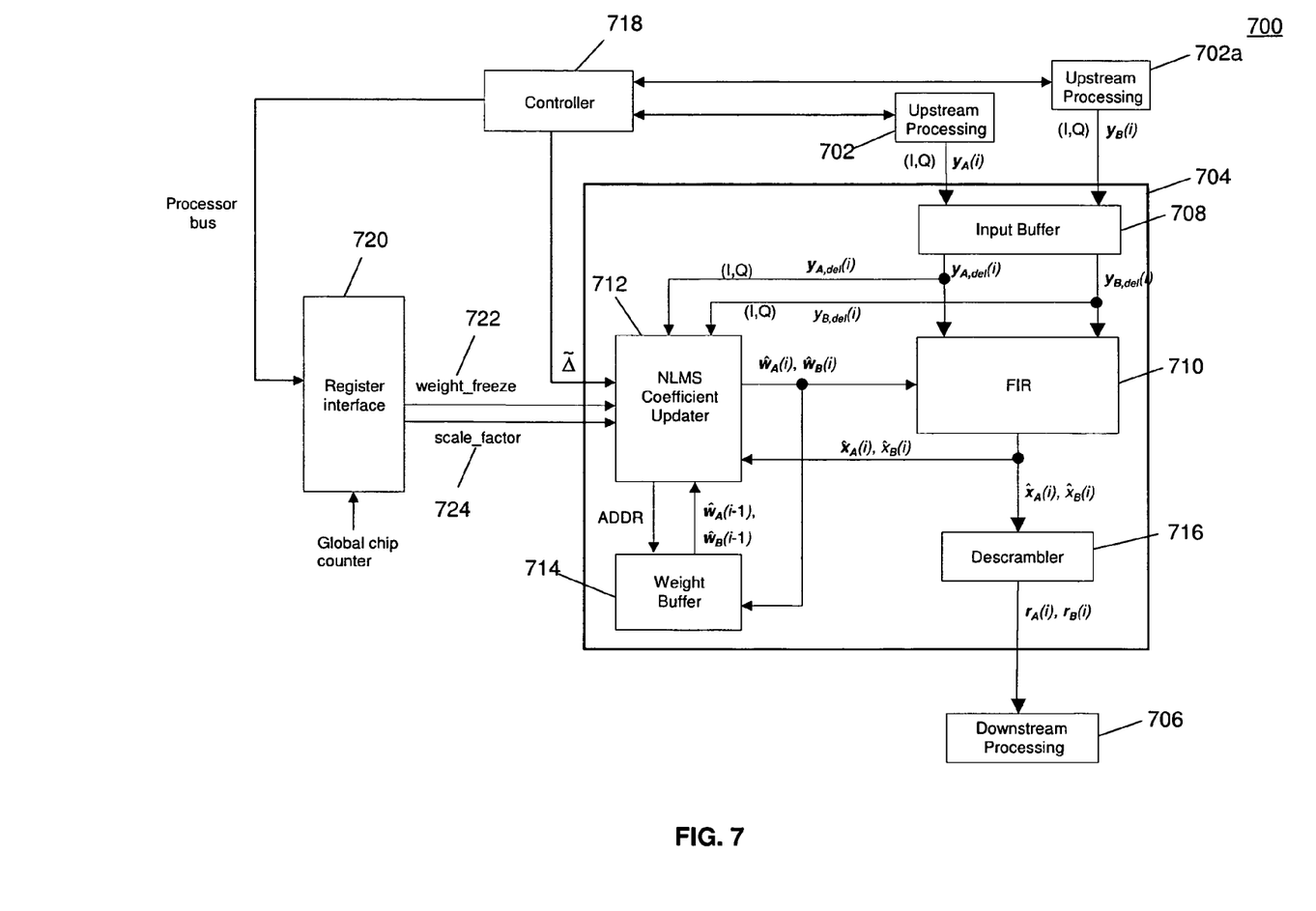
FIG. 7 shows a simplified block diagram of a receiver according to another embodiment of the present invention.

FIG. 7 shows a simplified block diagram of a receiver 700 according to another embodiment of the present invention. Receiver 700 has upstream processing 702, which performs operations analogous to those of upstream processing 102 of receiver 100, including automatic gain control, to generate a first digitized data signal $y_A(i)$ from a first received version of a transmitted signal. Receiver 700 also has upstream processing 702a, which also performs operations analogous to those of upstream processing 102 of receiver 100, including automatic gain control, to generate a second digitized data signal $y_B(i)$ from a second received version of the transmitted signal. NLMS equalizer 704 receives digitized data signals $y_A(i)$ and $y_B(i)$ from upstream processing 702 and 702a, equalizes and descrambles signals $y_A(i)$ and $y_B(i)$ to closely approximate the original pre-transmission signal, and outputs descrambled, equalized signals $r_A(i)$ and $r_B(i)$ in a time-multiplexed manner. Descrambled, equalized signals $r_A(i)$ and $r_B(i)$ are then processed by downstream processing 706, which might include, combining, symbol estimation, data symbol de-mapping, or other post-equalization processing for recovering one or more output data streams from the received versions.

NLMS equalizer 704 equalizes digital signals $y_A(i)$ and $y_B(i)$ using an update loop which comprises input buffer 708, finite impulse response (FIR) filter 710, coefficient updater 712, and weight buffer 714. Input buffer 708 receives signals $y_A(i)$ and $y_B(i)$, delays signals $y_A(i)$ and $y_B(i)$, and provides delayed signals $y_{A,del}(i)$ and $y_{B,del}(i)$ to FIR filter 710. Input buffer 708 also provides delayed signals $y_{A,del}(i)$ and $y_{B,del}(i)$ to coefficient updater 712. Coefficient updater 712 generates scaled coefficients $\hat{w}_A(i)$ and $\hat{w}_B(i)$ based on the occurrence or non-occurrence of gain adjustments by the AGCs for both received signals. The generation of scaled coefficients $\hat{w}_A(i)$ and $\hat{w}_B(i)$ is controlled by register interface 720 as described in further detail below. FIR filter 710 applies scaled coefficients $\hat{w}_A(i)$ and $\hat{w}_B(i)$ to delayed signals $y_{A,del}(i)$ and $y_{B,del}(i)$, respectively, and outputs time-multiplexed, equalized signals $\hat{x}_A(i)$ and $\hat{x}_B(i)$, which are subsequently descrambled by descrambler 716. The time-multiplexed, descrambled, equalized signals $r_A(i)$ and $r_B(i)$ are then provided to downstream processing 706.

Register interface 720 comprises (1) a freeze duration register, used for both received signals, (2) a first freeze start register for the first received signal, (3) a first scaling factor register for the first received signal, (4) a second freeze start register for the second received signal, and (5) a second scaling factor register for the second received signal. When an AGC gain adjustment is performed for the first received signal, controller 718 calculates a freeze start time and a scaling factor as described above in relation to controller 418 of receiver 400 and these values are stored in the first freeze start register and the first scaling factor register, respectively. Similarly, when an AGC gain adjustment is performed for the second received signal, controller 718 calculates a freeze start time and a scaling factor as described above in relation to controller 418 of receiver 400 and these values are stored in the second freeze start register and the second scaling factor register, respectively.

Figure 8:
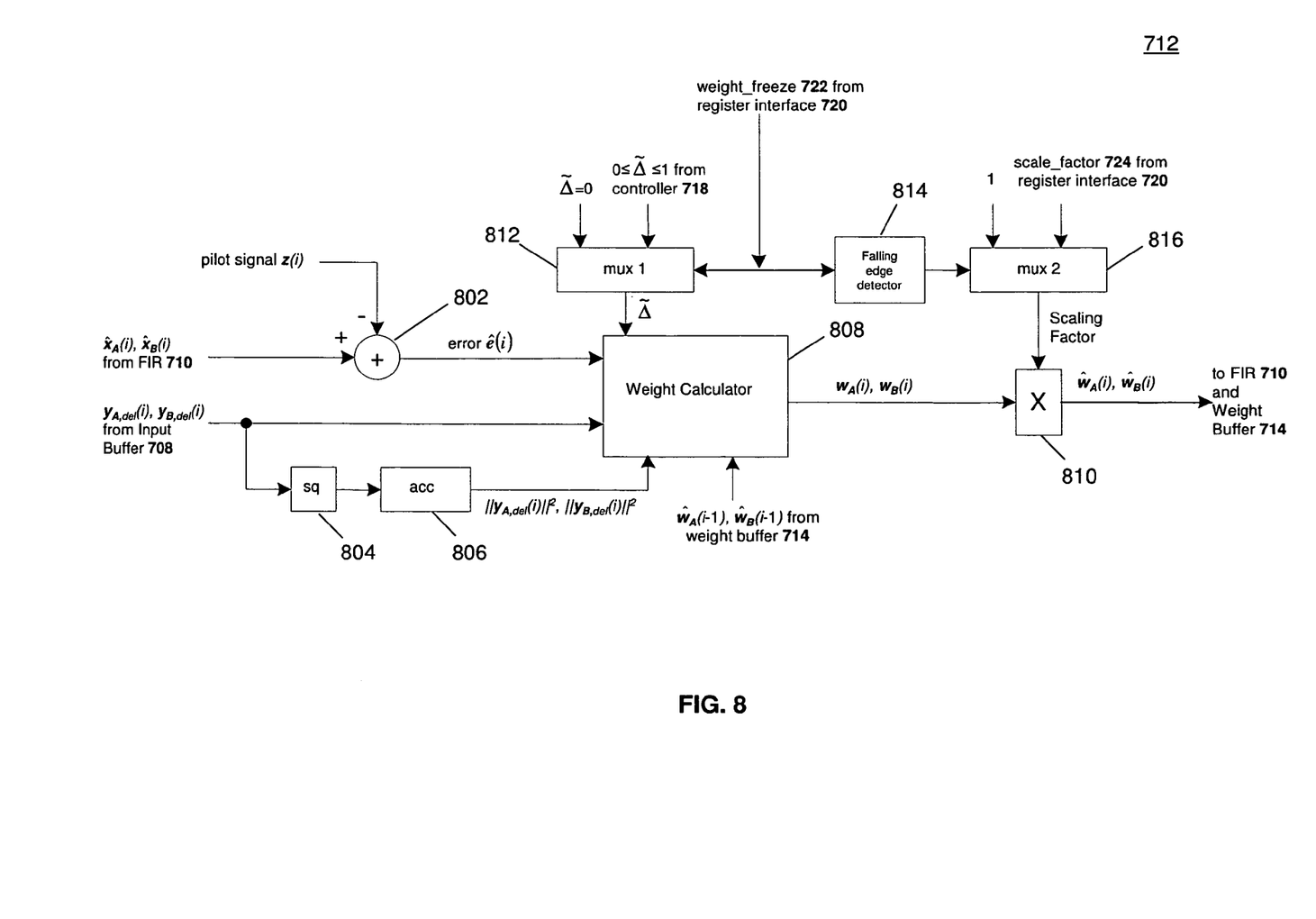
FIG. 8 shows a simplified block diagram of the coefficient updater of the receiver of FIG. 7 according to one embodiment of the present invention.

FIG. 8 shows a simplified block diagram of coefficient updater 712 of receiver 700 of FIG. 7. Coefficient updater 712 performs operations analogous to those of coefficient updater 412 of FIG. 5 to generate scaled coefficients $\hat{w}_A(i)$ when first received signal $y_A(i)$ is processed and scaled coefficients $\hat{w}_B(i)$ when second received signal $y_B(i)$ is processed. Note that, when the processing of the first received signal $y_A(i)$ corresponds to a gain adjustment made by the first AGC, weight_freeze signal 722 is asserted to freeze the coefficient updating of scaled coefficients WA (i) based on the freeze start time stored in the first freeze start register. When the weight_freeze signal 722 is first de-asserted, the scaling factor stored in the first scaling factor register is provided to mux2 816 and then the scaling factor is applied to coefficients $w_A(i)$. When the processing of the second received signal $y_B(i)$ corresponds to a gain adjustment made by the second AGC, weight_freeze signal 722 is asserted to freeze the coefficient updating of scaled coefficients $\hat{w}_B(i)$ based on the freeze start time stored in the second freeze start register. When the weight_freeze signal 722 is first de-asserted, the scaling factor stored in the second scaling factor register is provided to mux2 816 and then the scaling factor is applied coefficients $w_B(i)$.

According to additional embodiments of the present invention, a receiver may process two or more versions of a transmitted signal in a non-time-multiplexed manner. In such embodiments, the receiver may employ multiple instances of processing, such as multiple NLMS equalizers operating in parallel. Each NLMS equalizer may perform operations analogous to those of NLMS equalizer 404 of FIG. 4 for a separate version of the transmitted signal to generate a descrambled, equalized signal. Further, the register interface may comprise one freeze start register and one scaling factor register for each version of the transmitted signal. The descrambled, equalized signals from the two or more NLMS equalizers may then be combined downstream.

Further embodiments of the present invention may be envisioned for communications systems that employ transmit diversity techniques, such as transmitting data via two or more transmitter antennas. For example, suppose a transmitter transmits data using two antennas, and a receiver receives the data using one antenna. The receiver receives a combined signal that comprises the two transmitted signals. The combined signal may then be separated into two signals corresponding to the two transmitted signals and the two signals may be equalized using separate equalizers, wherein each equalizer performs operations analogous to those of NLMS equalizer 404 of FIG. 4. In this example, the receiver may employ a different freeze start register and a different scaling factor register for each different equalizer. Alternatively, if the combined signal is processed by a single AGC, then both equalizers may share one freeze start register and one scaling factor register.

According to the present invention, a communication system may also employ both transmit diversity and receive diversity techniques. For example, suppose a transmitter transmits data using two antennas, where each transmit antenna may transmit a different pilot channel, and a receiver receives the data using two antennas. Each receiver antenna receives a combined signal that comprises the two transmitted signals. Each combined signal received may be separated into the two signals, resulting a total of four separated signals. The four separated signals may then be equalized using four separate equalizers, wherein each equalizer performs operations analogous to those of NLMS equalizer 404 of FIG. 4.

Yet further embodiments of the present invention may be envisioned in which the scaling factor is applied to coefficients w(i) at times other than at the end of a freeze period. For example, the scaling factor may be applied at the beginning of a freeze period or at the middle of a freeze period.

Even yet further embodiments of the present invention may be envisioned in which a scaling factor is applied to coefficients w(i) without using a freeze period. In particular, the scaling factor may be applied at any time when the output of the AGC might reflect an AGC change (e.g., at any time between the minimum 306 and maximum 308 response times of FIG. 3.

While the background of the invention has been described in relation to systems that adhere to 3rd generation partnership project (3GPP) release 5 (R5) or release 6 (R6) standards, the present invention is not so limited. The present invention may be used with any other suitable communications system that employs receivers having at least one AGC and at least one equalizer.

While the present invention was described using an NLMS equalizer to equalize multiple versions of a received signal, the present invention is not so limited. Alternative embodiments of the present invention may be envisioned in which the receiver employs equalizers other than NLMS equalizers such as an LMS equalizer, a recursive least-squares equalizer, and any other suitable equalizer that adaptively generates filter coefficients. Furthermore, the present invention is not limited to the use of FIR filters. Other filters may be used without departing from the scope of this invention, including but not limited to infinite impulse response (IIR) filters.

While the present invention has been described in the context of upstream processing that includes AGC processing, where the equalizer processing is adjusted based on changes in that upstream AGC processing, the present invention can also be implemented in other contexts in which upstream processing includes types of gain control processing other than AGC processing, where equalizer processing is adjusted based on changes in that upstream gain control processing.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. An apparatus for processing an input signal, the apparatus comprising:
   an equalizing filter adapted to filter the input signal based on a set of filter coefficients to generate an equalized signal;
   a filter coefficient updater adapted to update the set of filter coefficients; and
   a controller configured to:
   (i) determine an amount of change in gain that is applied by an automatic gain controller to the input signal upstream of the equalizing filter;
   (ii) generate a scale factor based on the determined amount of the gain change; and
   (iii) instruct the filter coefficient updater to apply the scale factor to the set of filter coefficients, wherein, after the controller determines that the gain change occurs and before the controller instructs the filter coefficient updater to apply the scale factor, the controller instructs the filter coefficient updater to suspend the updating of the set of filter coefficients for a period of time.

2. The invention of claim 1, wherein:
   a beginning of the period of time corresponds to a specified minimum time after the controller determines that the gain change occurs at which the gain change can affect the input signal at the output of the automatic gain controller; and
   an end of the period of time corresponds to a specified maximum time after the controller determines that the gain change occurs at which the gain change can affect the input signal at the output of the automatic gain controller.

3. The invention of claim 2, wherein the controller instructs the filter coefficient updater to apply the scale factor to the set of filter coefficients at the end of the period of time.

4. The invention of claim 1, wherein the scale factor is proportional to a reciprocal of the gain change.

5. The invention of claim 1, wherein the filter coefficient updater is adapted to update the set of filter coefficients using a normalized-least-mean-squares approach.

6. The invention of claim 1, wherein the gain change is applied upstream to the input signal by the automatic gain controller.

7. A method for processing an input signal, the method comprising:
   (a) equalization filtering the input signal based on a set of filter coefficients to generate an equalized signal;
   (b) updating the set of filter coefficients;
   (c) determining an amount of change in gain that is applied by an automatic gain controller to the input signal upstream of the equalization filtering;
   (d) generating a scale factor based on the determined amount of the gain change; and
   (e) instructing a filter coefficient updater to apply the scale factor to the set of filter coefficients, wherein, after determining that the gain change occurs and before instructing the filter coefficient updater to apply the scale factor, the method comprises instructing the filter coefficient updater to suspend the updating of the set of filter coefficients for a period of time.

8. The invention of claim 7, wherein:
   a beginning of the period of time corresponds to a specified minimum time after determining that the gain change occurs at which the gain change can affect the input signal at the output of the automatic gain controller; and
   an end of the period of time corresponds to a specified maximum time after determining that the gain change occurs at which the gain change can affect the input signal at the output of the automatic gain controller.

9. The invention of claim 8, further comprising instructing the coefficient updater to apply the scale factor to the set of filter coefficients at the end of the period of time.

10. The invention of claim 7, wherein the scale factor is proportional to a reciprocal of the gain change.

11. The invention of claim 7, wherein the set of filter coefficients is updated using a normalized-least-mean-squares approach.

12. The invention of claim 7, further comprising applying the gain change upstream to the input signal using the automatic gain controller.

13. A method for processing an input signal, the method comprising:
   (a) equalizing a first portion of the input signal to generate a first portion of an equalized signal by filtering the first portion of the input signal using updated filter coefficients generated based on an error measure corresponding to the equalized signal;
   (b) determining an amount of change in gain that is applied by an automatic gain controller to the input signal upstream of the equalization filtering;
   (c) generating a scale factor based on the determined amount of the gain change;
   (d) instructing a filter coefficient updater to apply the scale factor to the set of filter coefficients to generate a set of scaled filter coefficients; and
   (e) equalizing a second portion of the input signal to generate a second portion of the equalized signal by filtering the second portion of the input signal using the scaled filter coefficients, wherein, after determining that the gain change occurs and before instructing the filter coefficient updater to apply the scale factor, the method comprises instructing the filter coefficient updater to suspend the updating of the filter coefficients.

14. The invention of claim 13, wherein:
   a beginning of the period of time corresponds to a specified minimum time after determining that the gain change occurs at which the gain change can affect the input signal at the output of the automatic gain controller; and
   an end of the period of time corresponds to a specified maximum time after determining that the gain change occurs at which the gain change can affect the input signal at the output of the automatic gain controller.

15. The invention of claim 14, further comprising instructing the filter coefficient updater to apply the scale factor to the updated filter coefficients at the end of the period of time.

16. The invention of claim 1, wherein the controller instructs the filter coefficient updater to:
   update the set of filter coefficients during a first period of time;
   suspend, following the first period of time, updating of the set of filter coefficients during a second period of time; and
   update, following the second period of time, the set of filter coefficients during a third period of time.

17. The invention of claim 7, comprising instructing the filter coefficient updater to:
   update the set of filter coefficients during a first period of time;

suspend, following the first period of time, updating of the set of filter coefficients during a second period of time corresponding to the occurrence of the gain change; and update, following the second period of time, the set of filter coefficients during a third period of time.

18. The invention of claim 13, comprising instructing the filter coefficient updater to:

update the set of filter coefficients during a first period of time;

suspend, following the first period of time, updating of the set of filter coefficients during a second period of time corresponding to the occurrence of the gain change; and update, following the second period of time, the set of filter coefficients during a third period of time.

19. The invention of claim 2, wherein the specified minimum time corresponds to a minimum possible response time of the automatic gain controller to a gain change command and the specified maximum time corresponds to a maximum possible response time of the automatic gain controller to a gain change command.

20. The invention of claim 8, wherein the specified minimum time corresponds to a minimum possible response time of the automatic gain controller to a gain change command and the specified maximum time corresponds to a maximum possible response time of the automatic gain controller to a gain change command.

21. The invention of claim 14, wherein the specified minimum time corresponds to a minimum possible response time of the automatic gain controller to a gain change command and the specified maximum time corresponds to a maximum possible response time of the automatic gain controller to a gain change command.

\* \* \* \* \*